C. A. GIEBELER-WANKE.
EYE MOUNTING FOR DOLLS' HEADS.
APPLICATION FILED JUNE 28, 1919.
1,361,847.
Patented Dec. 14, 1920.
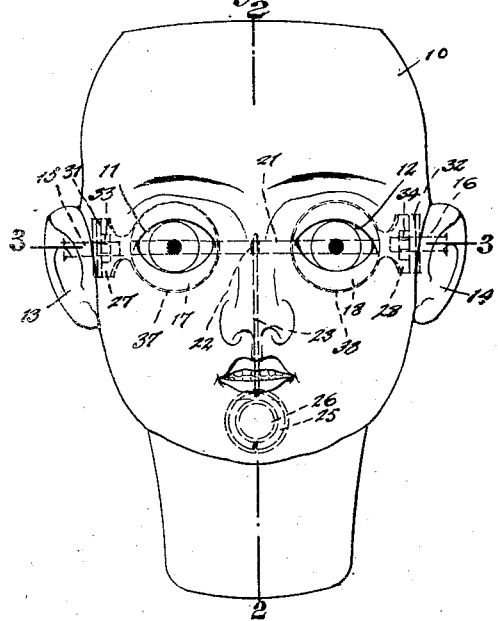
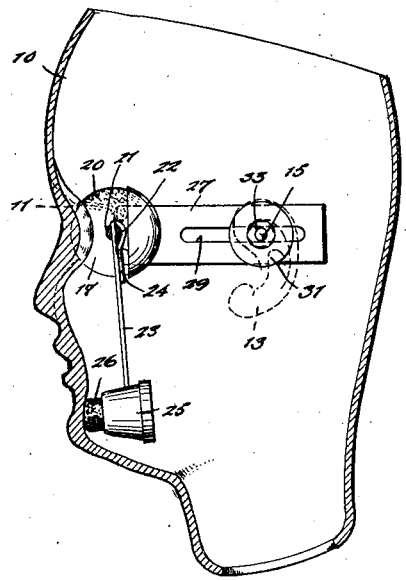
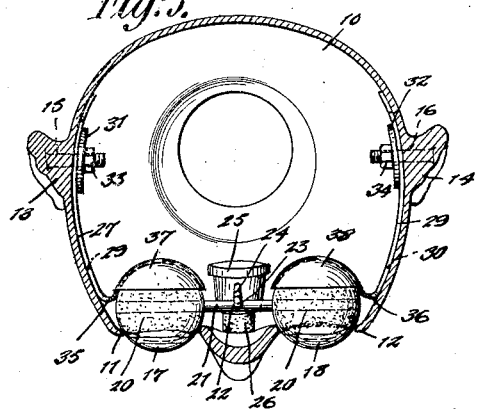
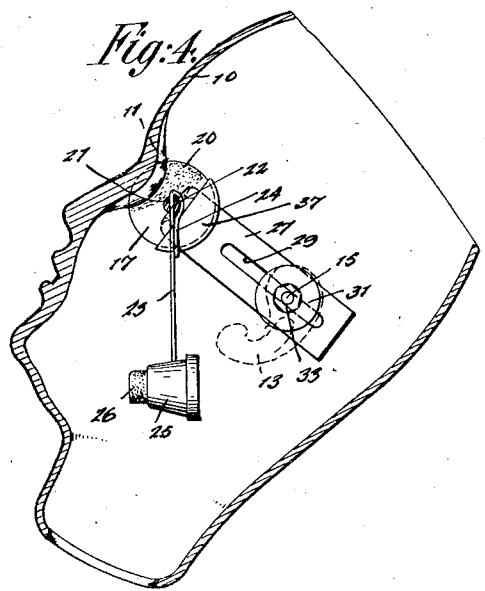
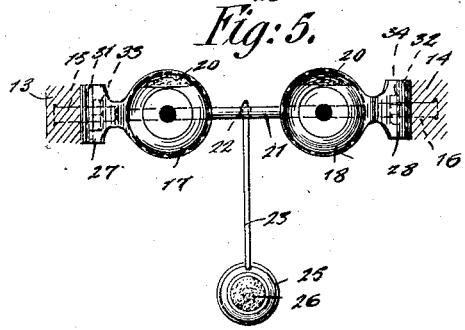
INVENTOR
Christoph Adolf Giebeler-Wanke
BY C. P. Goepel
ATTORNEY

UNITED STATES PATENT OFFICE.

CHRISTOPH ADOLF GIEBELER-WANKE, OF NEW YORK, N. Y.

EYE-MOUNTING FOR DOLLS' HEADS.

1,361,847. Specification of Letters Patent. Patented Dec. 14, 1920.

Application filed June 28, 1919. Serial No. 307,439.

*To all whom it may concern:*

Be it known that I, CHRISTOPH ADOLF GIEBELER-WANKE, a citizen of Germany, and a resident of the borough of Manhattan, in the city, county, and State of New York, have invented certain new and useful Improvements in Eye-Mountings for Dolls' Heads, of which the following is a specification.

The present invention relates to improvements in eye mountings for dolls' heads and has for an object to provide a mounting which will dispense with the use of wax or other such substances in securing the eyes in place and will permit of the accurate adjustment thereof to the end that the same will function properly, will not readily get out of order and will not be affected by weather conditions. The invention contemplated herein is especially desirable for metallic heads and for the mounting of spherical eyes of glass or other suitable substance.

With these and other objects in view, an embodiment of my invention is shown in the accompanying drawings and this embodiment will be hereinafter more fully described with reference thereto and the invention will be finally pointed out in the claims.

In the accompanying drawings:

Figure 1 is a front elevation of a doll head embodying one form of my invention;

Fig. 2 is a vertical section through the head;

Fig. 3 is a horizontal section taken along the line 3—3 of Fig. 1;

Fig. 4 is a view similar to Fig. 2 but showing the head tilted to an angle and illustrating the eye movement; and Fig. 5 is a front elevation of the eyes and mounting, showing the supporting portion of the head in section.

Similar reference characters indicate corresponding parts throughout the several figures of the drawings.

Referring to the drawings, the head 10 which is preferably formed of metal, is provided with spaced eye openings 11 and 12 and with solid integral ear portions 13 and 14 in which there are cast screw threaded studs 15 and 16.

The spherical eyeballs 17 and 18 are preferably of glass or other suitable substance being painted flesh color as at 20 in representation of eyelids, the said eyeballs being non-rotatably mounted in spaced relation upon the ends of a shaft 21. An aperture 22 is provided centrally of the shaft in which there is threaded the upper end of a depending rod 23 bent about the shaft upon itself as at 24, and provided at its lower end with a weight member 25 suitably attached thereto and having an inset 26 of rubber, cork or like substance constituting a bumper.

Interiorly of the head at each side there are provided curved plates 27 and 28 conforming to the surface of the head and provided with elongated slots 29 and 30 respectively engaging the studs 15 and 16 and held securely to the head by washers 31, 32 and nuts 33, 34 threaded upon the said studs. At their forward ends the said plates are bent inwardly as at 35 and 36 and terminate in cup-shaped portions 37 and 38 embracing the eyeballs at their inner sides and constituting with the eye openings 11 and 12 which confine the eyeballs at their front sides, sockets in which the eyeballs may be freely rotated upon tilting the head, the weight as shown in Fig. 4 causing the eyelid portions of the eyeballs to be brought into place in the openings in simulation of sleeping.

With my improvements the eyeballs may be accurately adjusted and with a minimum expenditure of time and labor. The mounting is permanent and will not readily get out of order nor will the same be affected by weather conditions. The members 26 and 27 being independent of each other and pliable, the eyeballs may be independently adjustable so that any irregularities in the head or in the eye openings may be allowed for and the eyeballs will function properly.

I have illustrated and described a preferred and satisfactory embodiment of my invention but it is obvious that changes may be made therein within the spirit and scope thereof as defined in the appended claims.

I claim:

1. In combination with a doll's head having spaced eye openings, an eye mounting comprising a pair of spaced eyeballs, means connecting said eyeballs and providing a horizontal turning axis therefor, cup members embracing said eyeballs rearwardly of said eye openings, and means adapted to support said cup members within said head and permitting their adjustment toward or away from said eye openings.

2. In combination with a doll's head having spaced eye openings, an eye mounting comprising a pair of spaced eyeballs, a shaft non-rotatably engaging said eyeballs and forming a common horizontal pivotal axis for said eyeballs, a depending weight upon said shaft adapted to rotate said eyeballs upon tilting of said head, cheek plates secured to the respective sides of said head, and cup members carried by said cheek plates independently embracing and supporting said eyeballs rearwardly of said eye openings, said cup members retaining said eyeballs in said eye openings, and constituting sockets therefor.

3. In combination with a doll's head having spaced eye openings, an eye mounting comprising a pair of spaced eyeballs, a shaft non-rotatably engaging said eyeballs and forming a common horizontal pivotal axis for said eyeballs, a depending weight upon said shaft adapted to rotate said eyeballs upon tilting of said head, cheek plates at the respective sides of said head provided with apertures, screws mounted in said head engaging said apertures and provided with nuts securing said cheek plates to said head, and cup members carried by said cheek plates independently embracing and supporting said eyeballs rearwardly of said eye openings, said cup members retaining said eyeballs in said eye openings, and constituting sockets therefor.

4. In combination with a doll's head having spaced eye openings, an eye mounting comprising a pair of spaced eyeballs engaging said openings, a rotary shaft supporting said eyeballs, a depending weight upon said shaft adapted to rotate said eyeballs upon tilting of said head, supporting means for said eyeballs comprising plates having elongated slots engaging the respective inner sides of said head, studs on said head adapted to engage said slots to secure said plates to the inner sides of said head, and cup-shaped portions on said plates independently embracing said eyeballs at their inner sides and constituting sockets therefor.

5. A doll head consisting of a single metallic hollow casting, enlargements cast exteriorly of said head and constituting ear portions, threaded studs permanently and non-removably cast in said respective enlargements and projecting therefrom interiorly of the head, an eye mechanism supported on said studs, and removable nuts screwed on said studs to retain the eye mechanism thereon.

In testimony that I claim the foregoing as my invention, I have signed my name hereunder.

CHRISTOPH ADOLF GIEBELER-WANKE.